US010713745B2

(12) United States Patent
Dawood

(10) Patent No.: US 10,713,745 B2
(45) Date of Patent: Jul. 14, 2020

(54) SYSTEMS AND METHODS FOR PROVIDING A VISIBLE WATERMARK IN A REMOTE SESSION

(71) Applicant: Citrix Systems, Inc., Fort Lauderdale, FL (US)

(72) Inventor: Muhammad A. Dawood, Cambridge (GB)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 186 days.

(21) Appl. No.: 15/817,832

(22) Filed: Nov. 20, 2017

(65) Prior Publication Data

US 2019/0156452 A1 May 23, 2019

(51) Int. Cl.
G06T 1/00 (2006.01)
G06F 3/14 (2006.01)
(52) U.S. Cl.
CPC .......... *G06T 1/0028* (2013.01); *G06F 3/1454* (2013.01); *G06T 1/0021* (2013.01); *G06T 2201/0051* (2013.01); *G06T 2201/0061* (2013.01); *G09G 2358/00* (2013.01); *G09G 2370/022* (2013.01)
(58) Field of Classification Search
CPC .......... G06T 1/0028; G06T 1/0021; G06T 2201/0051; G06T 2201/0061; G06F 3/1454; G09G 2358/00; G09G 2370/022
See application file for complete search history.

(56) References Cited

U.S. PATENT DOCUMENTS

| 6,427,020 | B1* | 7/2002 | Rhoads | G06T 1/0021 283/901 |
| 7,295,677 | B2* | 11/2007 | Simpson | G06T 1/0021 382/100 |
| 9,471,951 | B2* | 10/2016 | Agrawal | G06F 9/452 |
| 10,049,421 | B2* | 8/2018 | Kofod | G06T 1/0021 |

(Continued)

FOREIGN PATENT DOCUMENTS

EP 2 344 957 A2 7/2011

OTHER PUBLICATIONS

International Search Report and Written Opinion of the International Searching Authority dated Mar. 4, 2019 for PCT/US2018/061344.

*Primary Examiner* — Pinalben Patel
(74) *Attorney, Agent, or Firm* — Fox Rothschild LLP; Robert J. Sacco; Carol E. Thorstad-Forsyth

(57) ABSTRACT

Systems and methods for providing a visible watermark in a remote session. The methods comprise: determining if a graphic update needs to be made at a client computing device during the remote session; generating a first graphic update message in response to a determination that a graphic update is needed; identifying pixels of the graphic which would be affected by at least one watermark if the graphic and watermark were both displayed on a screen of the client computing device; constructing a second string of commands specifying a new color value for each of the pixels that were previously identified; converting the first graphic update message to a second graphic update message by inserting the second string of commands in between a first string of commands and an End-Of-Frame ("EOF") command; and communicating the second graphic update message from the sever to the client computing device.

18 Claims, 12 Drawing Sheets

(56) References Cited

U.S. PATENT DOCUMENTS

| | | | |
|---|---|---|---|
| 10,091,197 B2* | 10/2018 | Rhoads | H04W 12/02 |
| 2006/0136835 A1 | 6/2006 | Hochmuth et al. | |
| 2010/0194753 A1* | 8/2010 | Robotham | G06F 3/14 |
| | | | 345/428 |
| 2012/0315011 A1* | 12/2012 | Messmer | H04N 21/8358 |
| | | | 386/230 |
| 2018/0047126 A1* | 2/2018 | Falkenstern | G06T 1/0021 |

* cited by examiner

FIG. 3

(Prior Art)

Graphics Update Message 300: Graphic Update Command 302 | Graphic Update Command 304 | ... | Graphic Update Command 306 | End-Of-Frame ("EOF") Command 308

FIG. 4

Graphics Update Message 400: Graphic Update Command 402 | Graphic Update Command 404 | ... | Graphic Update Command 406 | Watermark Based Graphic Update Command 408 | Watermark Based Graphic Update Command 410 | ... | Watermark Based Graphic Update Command 412 | End-Of-Frame ("EOF") Command 414

Watermark Bit Map 1100

| Block Identifier | | | Pixel Bit Values | | | |
|---|---|---|---|---|---|---|
| | 1 | 2 | 4 | 44 | 45 | NxN |
| Consolidated Block 1102 | 0 | 0 | 0 | 1 | 1 | 0 |

FIG. 11

SYSTEMS AND METHODS FOR PROVIDING A VISIBLE WATERMARK IN A REMOTE SESSION

BACKGROUND

Statement of the Technical Field

The present disclosure relates generally to computing systems. More particularly, the present disclosure relates to implementing systems and methods for providing a visible watermark in a remote session.

Description of the Related Art

A watermark acts as a visible deterrent against the potential leakage of sensitive or classified information from computer's screen to the outside world. There are two ways of adding a watermark to a remote session: (1) render the watermark as part of the server's frame buffer ("server-only"); or (2) instruct the end-point client software to display a watermark after each screen update.

Technique (1) is a pure server-only solution (i.e., no end-point upgrade required). The watermark is composed onto the server's frame buffer, and therefore rendered as part of any graphics screen updates that are sent to the end-point. The primary disadvantage of this technique is a requirement for extra Central Processing Unit ("CPU") resources to compose the watermark.

Technique (2) has the disadvantage that the end-point software must be upgraded if the ability to show a partially transparent overlay after each screen update is not supported. This might be somewhat problematic if the end-points are difficult or impossible to upgrade (e.g., old thin clients) or the number of end-points are too many in number.

SUMMARY

The present disclosure concerns implementing systems and methods for providing a visible watermark in a remote session. The methods comprise: performing operations by a server to determine if a graphic update needs to be made at a client computing device during the remote session; generating a first graphic update message (e.g., a string of commands) in response to a determination that a graphic update is needed; identifying pixels of the graphic which would be affected by at least one watermark if both the graphic and the watermark were displayed on a screen of the client computing device; constructing a second string of commands specifying a new graphic update (e.g., a bitmap) comprising new color values for each of the pixels that were previously identified; converting the first graphic update message to a second graphic update message by inserting the second string of commands in between a first string of commands and the EOF command; and communicating the second graphic update message from the sever to the client computing device. These operations can be performed by a Graphics Encoder ("GE") of the server.

In some scenarios, the methods also comprise: using a device identifier for the client computing device to obtain respective pre-defined watermark parameter information from a datastore; generating at least one full screen size watermark image based on the obtained respective pre-defined watermark parameter information and a known screen size of the client computing device; and identifying an area of the at least one full screen size watermark image where a watermark exists. The full screen size watermark image includes, but is not limited to, at least one instance of a watermark on a white or black background. The area is identified by: segmenting the at least one full screen size watermark image into a plurality of equally sized blocks; identifying which blocks of the plurality of equally sized blocks contain a portion of the watermark; and/or consolidating adjacent ones of the identified blocks to create a larger block.

A watermark bit map is then generated that indicates (a) the identified area of the at least one full screen size watermark image where the watermark exists and (b) which pixels of the identified area comprise the watermark. The watermark bit map is used to identify the pixels of the graphic which would be affected by the watermark when the graphic and the watermark are both displayed on a screen of the client computing device.

BRIEF DESCRIPTION OF THE DRAWINGS

The present solution will be described with reference to the following drawing figures, in which like numerals represent like items throughout the figures.

FIG. 3 is an illustration of an illustrative conventional graphics update message.

FIG. 4 is an illustration of an illustrative graphics update message.

FIG. 11 is an illustration of an illustrative watermark bit map.

DETAILED DESCRIPTION

Figure 1:
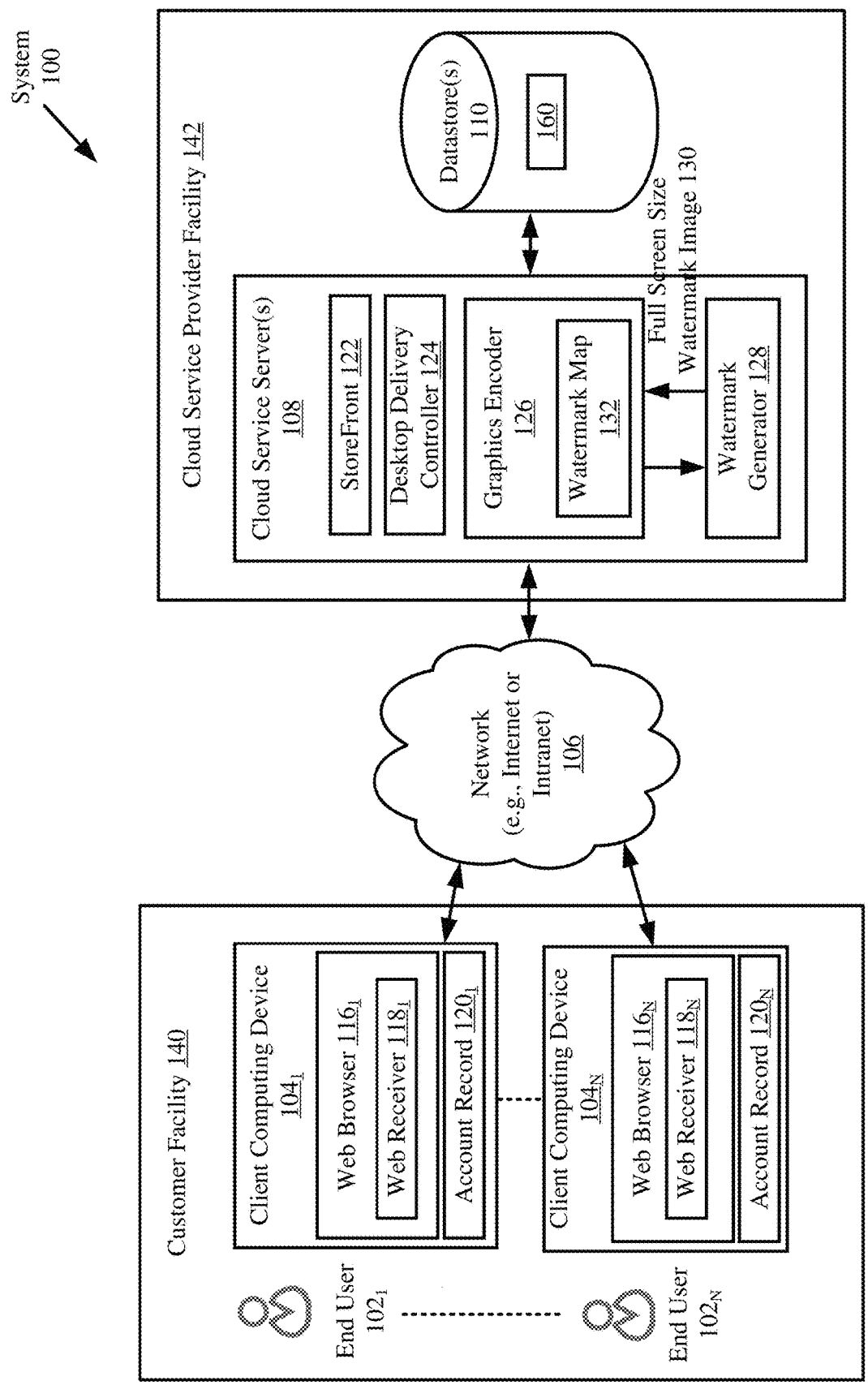
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution concerns systems and methods for providing a visible watermark in a remote session. The present solution is implemented as a server-only solution (i.e., no end-point upgrade required) due to the ease of deployment, compatibility with all variants of end-point software and the generally accepted view that a server-only solution is more secure.

An initial server-only prototype involved a user-mode application running alongside other applications in a user's session. The user-mode application applied a watermark to a server's frame buffer by creating a full-screen partially transparent window containing the desired watermark text. A Desktop Window Manager ("DWM") performed the alpha-based composition with the full-screen partially transparent window and other desktop windows to give the desired effect. The resultant graphics were then encoded by a Graphics Encoder ("GE") and sent to an end-point for display.

The initial server-only prototype has the following drawbacks: (1) the user-mode watermark process can be terminated, resulting in the watermark being removed; and (2) the resultant graphics updates ("input images") that are fed into the GE are very unlikely to exhibit any properties that help with caching or compression, thus increasing the overall network bandwidth required. Drawback (1) can be solved by applying special permissions to the watermark process. Experimental data has shown that for a 50-minute automated workload consisting of Office productivity applications, 15× more bandwidth was used compared with the same workload but without the watermark present. In addition, 7× more server CPU was also required due to the complexity and lack of any cacheable properties of the encoded graphics with the watermark present.

The present solution provides a technique that offers a server-only watermark but at a fraction of the aforementioned network bandwidth and server CPU costs of the initial server-only prototype. The present solution has the following novel features: (1) ease of deployment (pure server-only solution); (2) no new protocol commands introduced (will work with all existing Receivers); (3) lower bandwidth impact (2-3× increase) compared with the initial server-only prototypes (15× increase) and other conventional server-only solutions; and (4) lower CPU impact (1.5-2×) compared with the initial server-only prototype (7×) and other conventional server-only solutions.

Rather than having a dedicated watermark process provide the watermark and rely on a Composition Manager ("CM") to render the resultant images, a GE has been modified to perform watermark composition after normal processing of graphics updates. The process generally involves the following operations. On GE initialization, a full-screen watermark framebuffer (partially transparent with the desired watermark text and/or image configured by the administrator) is computed. Next, a bit map is constructed that describes which parts of the framebuffer has watermark information present. The computation and map construction operations are collectively a one-time operation which should be done every time the GE is initialized (e.g., on monitor layout changes). Usual GE operations are then performed on the input graphic updates. These GE operations primarily involve caching and compression optimizations to reduce network bandwidth usage. Prior to instructing the end-point to show the latest screen update (End-Of-Frame ("EOF") command), the intersection of the graphics update and any watermark information on the pre-computed watermark framebuffer is calculated using the bit map constructed on initialization. As the bit map describes the watermark framebuffer as a plurality of blocks (e.g., each 16×16 pixels). The affected areas are computed as rectangular strips of that are X-pixels (e.g., 16-pixels) high using the previously constructed map. The present computational operation effectively narrows in on the parts of the watermark that need to be sent since not all of the watermark needs composing if the graphics updates only touches a small portion of it. Thereafter, an alpha-blend composition operation of these strips is performed. This is also known as an "over" operation whereby pixels from the input image and watermark are combined to produce a merged color representing both pixels. The composed strips are sent as lossless Run-Length Encoding ("RLE") overlay bitmaps to the end-point. These bitmaps are sent in the same way as other lossless bitmaps (cached), and therefore may be reused if the same bitmap is generated at some later point. An EOF command is then issued to instruct the end-point to show all updates.

The present solution has the following advantages. All encoder optimizations are still performed on untainted input graphics updates. This results in the best possible cache reuse and compression benefits, as well as a large reduction in bandwidth usage. Being server-only, no client software upgrade is required to enable new functionality. The extra CPU cost comes as a result of the over operation and is a relatively cheap operation. The composed bitmap formed by the alpha-blend operation is generated server side and requires no new protocol. As far as the protocol is concerned, this is just a regular bitmap that will be compresses using a lossless codec (e.g., the Citrix lossless codes). As no new commands have been introduced, this approach is by default compatible with all existing end-points. The watermark application is implemented as part of the GE process, and therefore cannot be tampered with. Terminating the GE process will result in no graphics updates whatsoever being sent to the end-point and is therefore automatically secure.

Experimentation has shown that for the same automated workload mentioned above, the bandwidth usage is approximately 2-3× higher than without the watermark present, and CPU usage is approximately 1.5-2× higher. This represents a massive reduction over the initial prototype (15× higher bandwidth). Early indications have shown that the 2-3× increase is acceptable for some customers due to the ease of deployment and reduced security risks versus a client solution.

Referring now to FIG. 1, there is provided an illustration of an illustrative system 100. System 100 implements methods for providing a visible watermark in a remote session. In this regard, system 100 comprises a customer facility 140 and a cloud service provider facility 142. The customer facility 140 comprises one or more buildings of a customer, such as a business organization. The customer has a plurality of end users $102_1$-$102_N$. The end users can include, but are not limited to, employees. The end users $102_1$-$102_N$ respectively use client computing devices $104_1$-$104_N$ for a variety of purposes, such as accessing and using cloud services provided by a cloud service provider. In this regard, the client computing devices $104_1$-$104_N$ are configured to facilitate access to applications and virtual desktops without interruptions resulting from connectivity loss. Accordingly, the client computing devices $104_1$-$104_N$ have installed thereon and execute various software applications. These software applications include, but are not limited to, Web Browsers $116_1$-$116_N$ and/or Web Receivers $118_1$-$118_N$.

In some scenarios, the Web Receivers $118_1$-$118_N$ can respectively include, but are not limited to, Citrix Receivers available from Citrix Systems, Inc. of Florida and Citrix Receivers for a web site available from Citrix Systems, Inc. of Florida. Citrix Receivers comprise client software that is required to access applications and full desktops hosted by servers remote from client devices. The present solution is not limited in this regard.

The client computing devices $104_1$-$104_N$ also have various information stored internally. This information includes, but is not limited to, account records $120_1$-$120_N$. The client computing devices $104_1$-$104_N$ are able to communicate with each other via an Intranet and with external devices via the Internet. The Intranet and Internet are shown in FIG. 1 as a network 106.

The external devices include one or more cloud service servers 108 located at the cloud service provider facility 142. The cloud service provider facility 142 comprises one or more buildings of a cloud service provider. The server(s) 108 is(are) configured to facilitate access to applications and virtual desktops without interruptions resulting from connectivity loss. Accordingly, the server 108 has installed thereon and executes various software applications. The software applications include, but are not limited to, a StoreFront 122 and a Desktop Delivery Controller ("DDC") 124. StoreFronts and DDCs are well known in the art, and therefore will not be described herein. Any known or to be known StoreFront and/or DDC can be employed herein. The server 108 is also configured to access the datastore 110 in which publishing information 160 is stored, and is also able to write/read from the datastore(s) 110. The publishing information 160 includes, but is not limited to, software applications, code, media content (e.g., text, images, videos, etc.), and/or watermark related information.

The cloud service servers 108 also comprise a GE 126. GEs are well known in the art, and therefore will not be described in detail herein. Any known or to be known GE can be used herein without limitation. For example, GE 126 comprises a GE described in U.S. Pat. No. 9,754,385 ("the '385 patent"), the contents of which are incorporated herein by reference. In this case, the '385 patent's GE is modified to perform one or more of the operations described herein for implementing the present solution (e.g., causing a client computing device to display at least one watermark on a screen).

The GE 126 is generally operative to receive graphics (e.g., an application window, an image, an icon, and/or any other visual feature of a desktop or window) from other components 122, 124 of the cloud service server 108 that are to be rendered on a display screen of the client computing device $104_1$-$104_N$ during a session established between the client computing device $104_1$-$104_N$ and the cloud service server 108. The GE 126 analyzes the received graphics to determine if any graphic updates need to be reported to the client computing device $104_1$-$104_N$. If so, the GE 126 generates a graphics update message with watermarking information and communicates the same to the Web Receiver $118_1$-$118_N$ via network 106. In response to the graphics update message, the Web Receiver $118_1$-$118_N$ builds updated graphics in accordance with commands contained in the graphics update message, and displays the same on a screen.

An illustration of a conventional graphics update message 300 is provided in FIG. 3. As shown in FIG. 3, the conventional graphics update message 300 comprises a plurality of graphic update commands 302-306 and an End-Of-Frame ("EOF") command 308. The graphic update commands 302-306 can include, but are not limited to, a command for drawing a new image at a first location on a screen, a command for drawing new text at a second location on the screen, a command for drawing an image from a local cache at a third location on the screen, and/or a command for copying one part of the screen to another part of the screen. Once the sequence of commands has been generated for a screen update, the EOF command 308 is inserted at the end thereof. The EOF command 308 is provided to instruct the Web Receiver to display on screen the updated graphics constructed in memory for a given frame in accordance with the graphic update commands 302-306.

Referring now to FIG. 4, there is provided a graphics update message 400 generated by the GE 126. The graphics update message 400 includes additional information than that contained in the conventional graphics update message 300. In this regard, it should be appreciated that the graphics update message 400 comprises a plurality of graphic update commands 402-406 and an EOF command 414. These commands 402-406, 414 are the same as or similar to the commands 302-306, 308 of the conventional graphics update message 300. In addition to these commands 402-406, 414, the graphics update message 400 comprises at least one watermark based graphic update command 408-412. The watermark based graphic update command 408-412 includes, but is not limited to, information indicating which pixels of a graphic should include a watermark and the re-computed color values for these pixels. The present solution compiles this information as a 2D array of pixels (a "bitmap"), whose pixels are that of the original input image color values where the watermark does not appear, and the recomputed color values where the watermark does appear.

These extra watermark based graphics updates ("overlays") can be inserted into the frame's graphics update message as conventional graphics update commands and this introduces no new commands that the end-point is unaware of.

Figure 5:
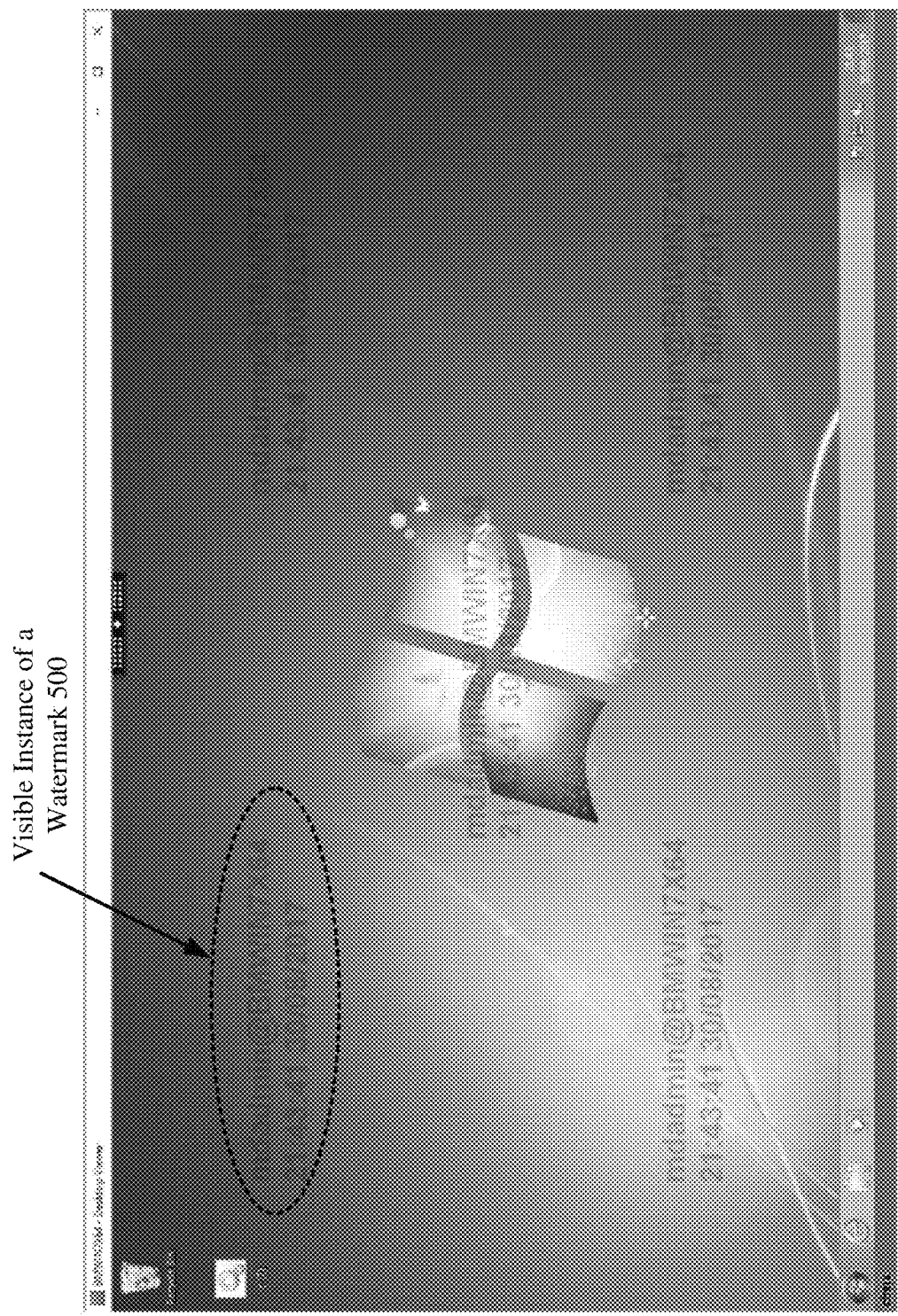
FIG. 5 is an illustration of an illustrative displayed desktop screen having five visible instances of a watermark.

Referring now to FIG. 5, there is provided an illustration of an illustrative displayed desktop screen having five visible instances of a watermark 500. The present solution is not limited to the particulars of FIG. 5. For example, any number of visible watermark instances can be provided on one or more graphics displayed on a screen. Also, the watermark can include any information selected in accordance with a given application. For example, each customer (or company) can specify different content, text or otherwise, to be included in respective watermarks.

Figure 2:
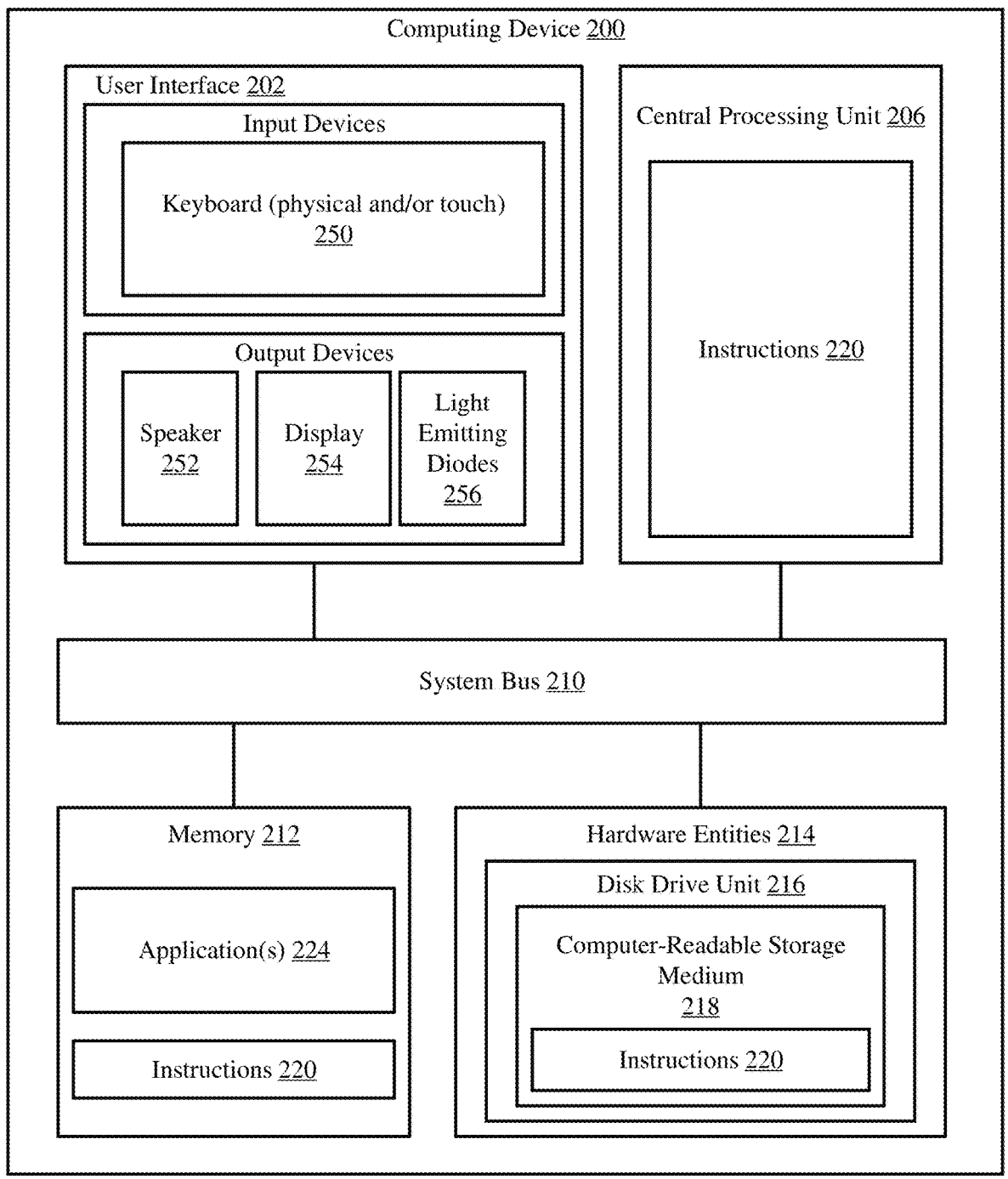
FIG. 2 is an illustration of an illustrative computing device.

Referring now to FIG. 2, there is provided an illustration of an exemplary architecture for a computing device 200. Computing devices $104_1$-$104_N$ and server(s) 108 of FIG. 1 (is)are the same as or similar to computing device 200. As such, the discussion of computing device 200 is sufficient for understanding these components of system 100.

In some scenarios, the present solution is used in a client-server architecture. Accordingly, the computing device architecture shown in FIG. 2 is sufficient for understanding the particulars of client computing devices and servers.

Computing device 200 may include more or less components than those shown in FIG. 2. However, the components shown are sufficient to disclose an illustrative solution implementing the present solution. The hardware architecture of FIG. 2 represents one implementation of a representative computing device configured to enable watermarking of graphics, as described herein. As such, the computing device 200 of FIG. 2 implements at least a portion of the method(s) described herein.

Some or all the components of the computing device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a Central Processing Unit ("CPU") 206, a system bus 210, a memory 212 connected to and accessible by other portions of computing device 200 through system bus 210, and hardware entities 214 connected to system bus 210. The user interface can include input devices and output devices, which facilitate user-software interactions for controlling operations of the computing device 200. The input devices include, but are not limited, a physical and/or touch keyboard 250. The input devices can be connected to the computing device 200 via a wired or wireless connection (e.g., a Bluetooth® connection). The output devices include, but are not limited to, a speaker 252, a display 254, and/or light emitting diodes 256.

At least some of the hardware entities 214 perform actions involving access to and use of memory 212, which can be a Radom Access Memory ("RAM"), a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 200 and that cause the computing device 200 to perform any one or more of the methodologies of the present disclosure.

Figure 6A:
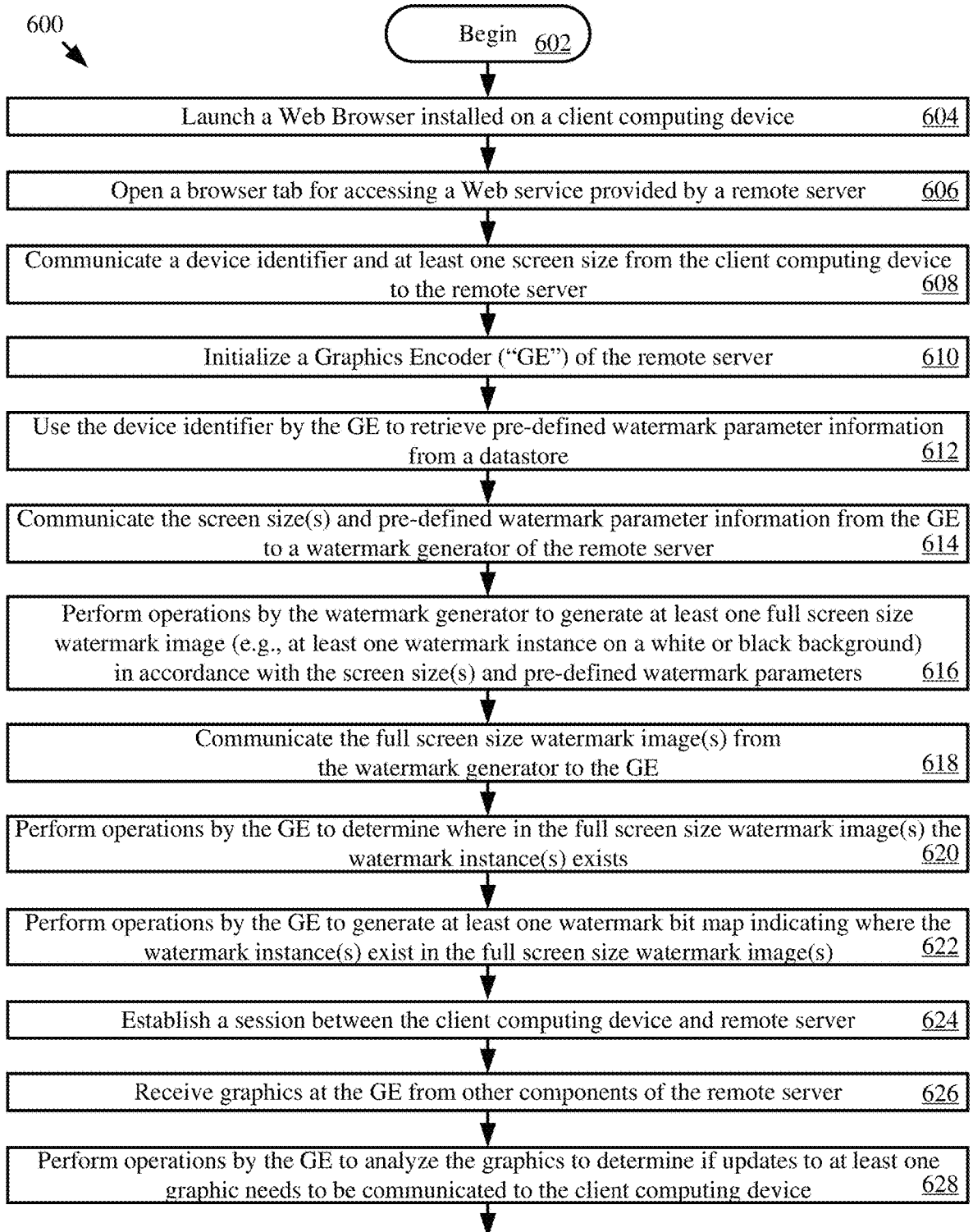
FIGS. 6A-6C (collectively referred to as "FIG. 6") provide a flow diagram of an illustrative method for providing a visible watermark in a remote session.
Figure 6B:
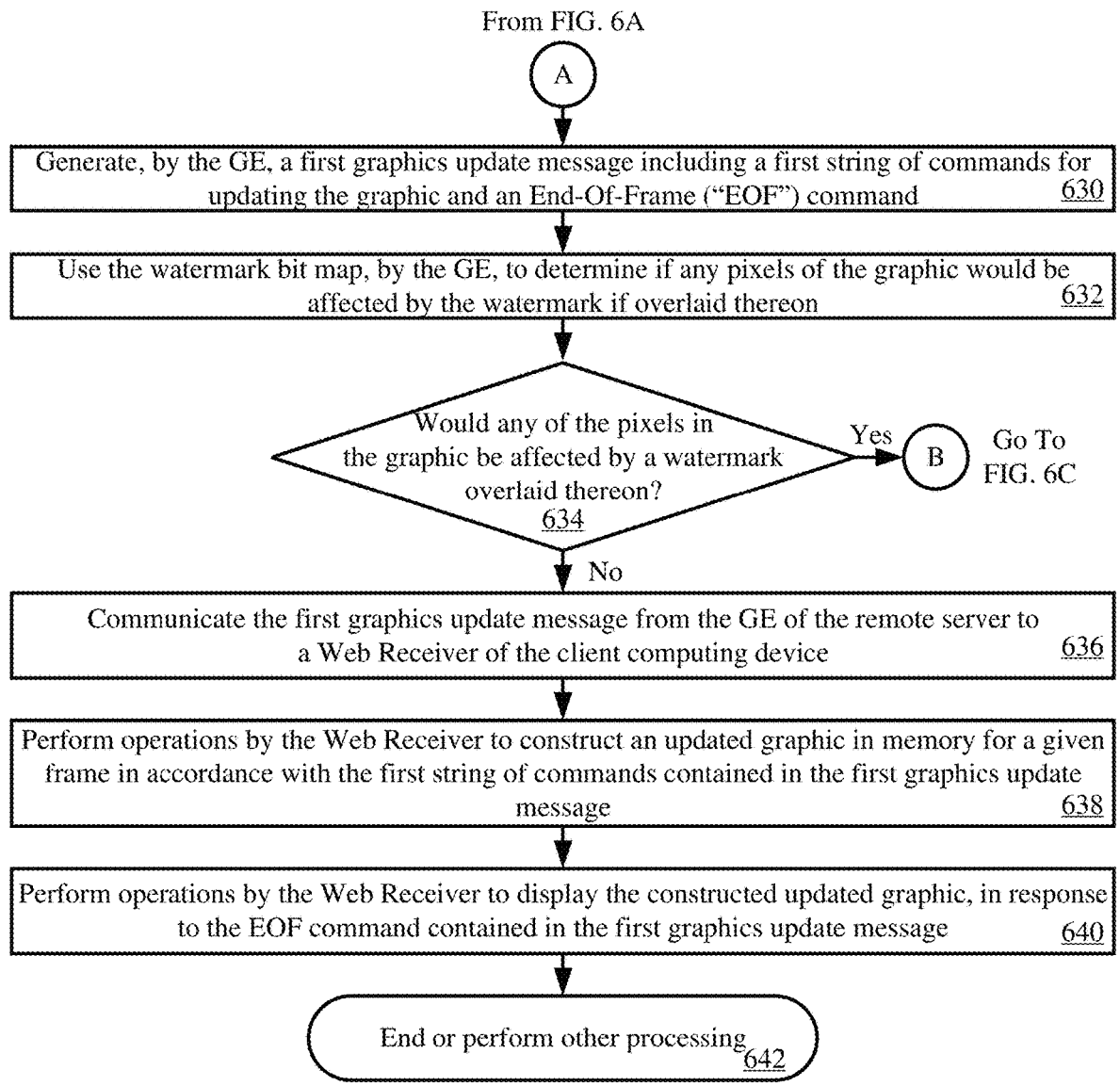
Figure 6C:
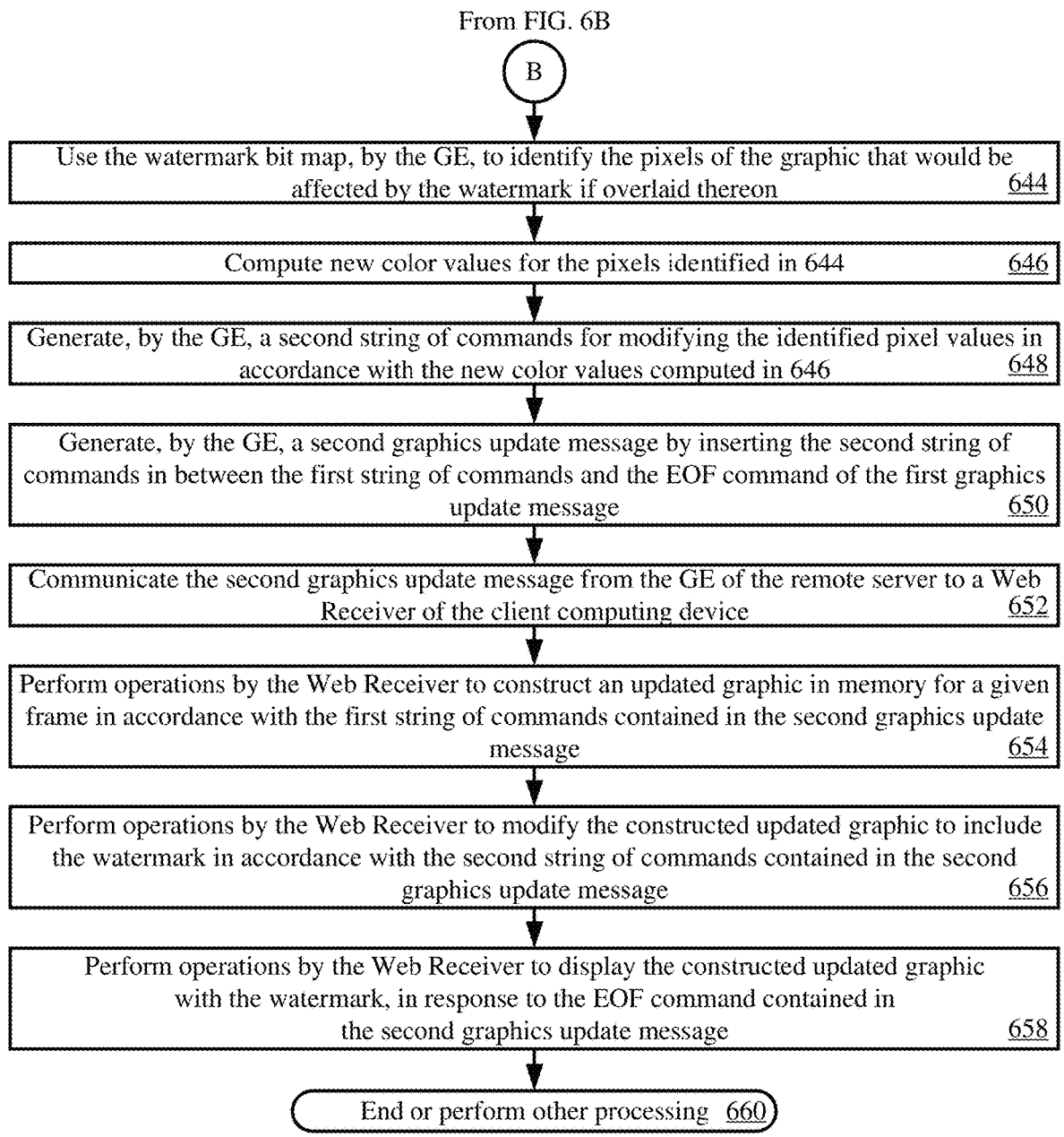

Referring now to FIG. 6, there is shown a flow diagram of an illustrative method 300 for providing a visible watermark in a remote session. Method 300 begins with 302 and continues with 304 where a Web Browser (e.g., Web Browser $116_1$, . . . , or $116_N$ of FIG. 1) is launched. The Web Browser is installed on a client computing device (e.g., client computing device $104_1$, . . . , or $104_N$ of FIG. 1). A browser tab is then opened in 606 for accessing a Web service provided by a remote server (e.g., cloud service server 108 of FIG. 1). Next in 608, a device identifier and at least one screen size is communicated from the client computing device to the remote server. In response to the remoter servers reception of this information, a GE (e.g., GE 126 of FIG. 1) of the remote server is initialized, as shown by 610.

At this time, the remote server performs operations 612-622 to generate at least one watermark bit map. 612 involves using the device identifier by the GE to retrieve pre-defined watermark parameter information from a datastore (e.g., datastore 110 of FIG. 1). The watermark parameter information can include, but is not limited to, information specifying the contents of a watermark (e.g., an icon, text or other symbols), information specifying the number of watermark instances to be included in a full screen size watermark image, and/or information specifying the relative locations of the watermark instances within a full screen size watermark image. In 614, the screen size(s) and the retrieved pre-defined watermark parameter information are communicated from the GE to a watermark generator (e.g., watermark generator 128 of FIG. 1) of the remote server. The watermark generator then performs operations in 616 to generate at least one full screen size watermark image (e.g., at least one watermark instance on a white or black background) in accordance with the screen size(s) and pre-defined watermark parameter information.

Figure 7:
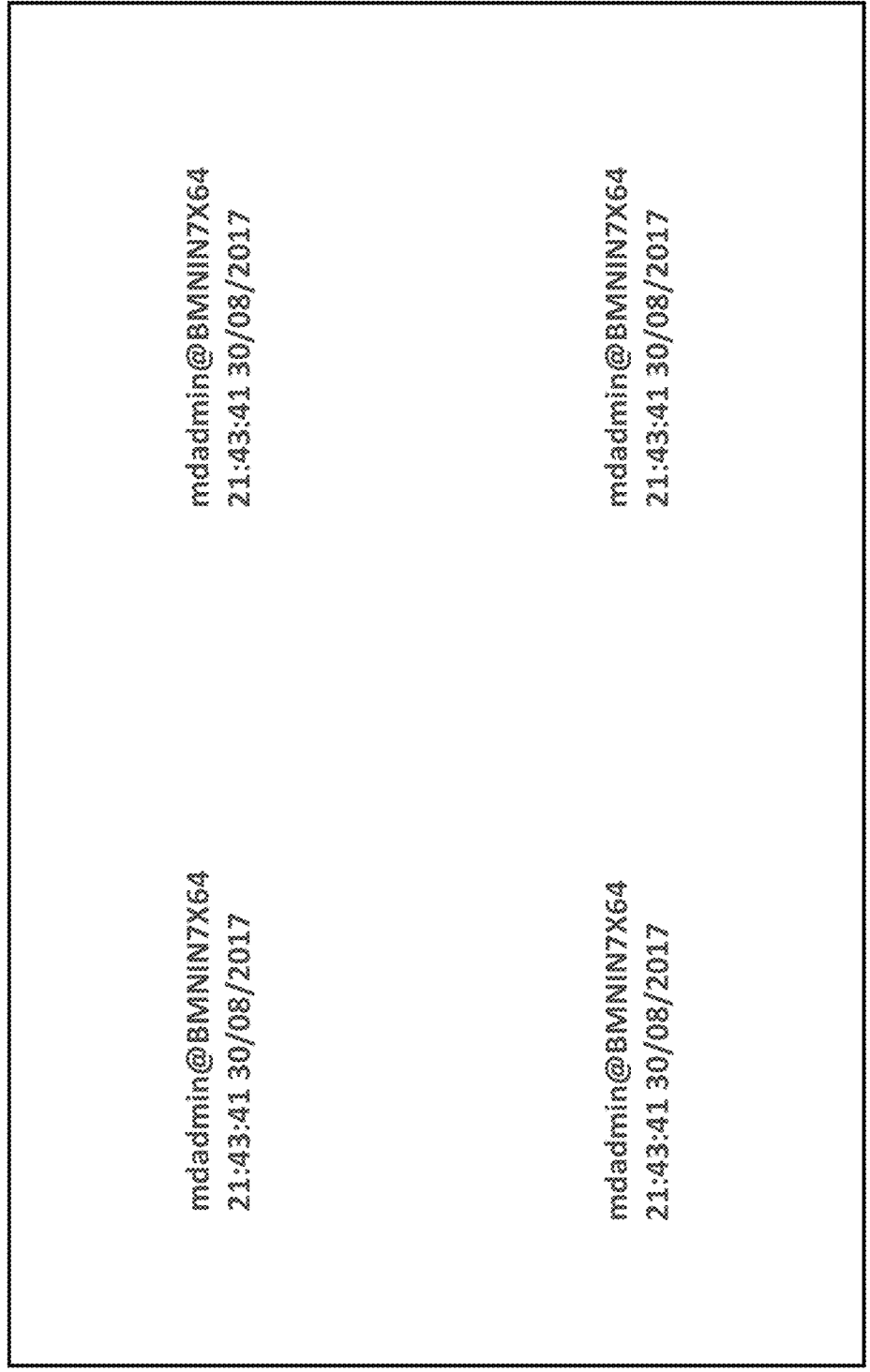
FIG. 7 is an illustration of an illustrative full screen size watermark image.

An illustration of an illustrative full screen size watermark image 700 is provided in FIG. 7. The full screen size watermark image 700 comprises four instances of the following watermark.

mdadmin@BMWIN7X64
21:43:41 30 Aug. 2017

The watermark instances reside at different locations within the image 700. The image 700 also has a white background. The present solution is not limited to the particulars of the illustration. For example, any number of watermark instances can be contained in a full screen size watermark image. Also, the watermark can include any content selected in accordance with a particular application.

Figure 8:
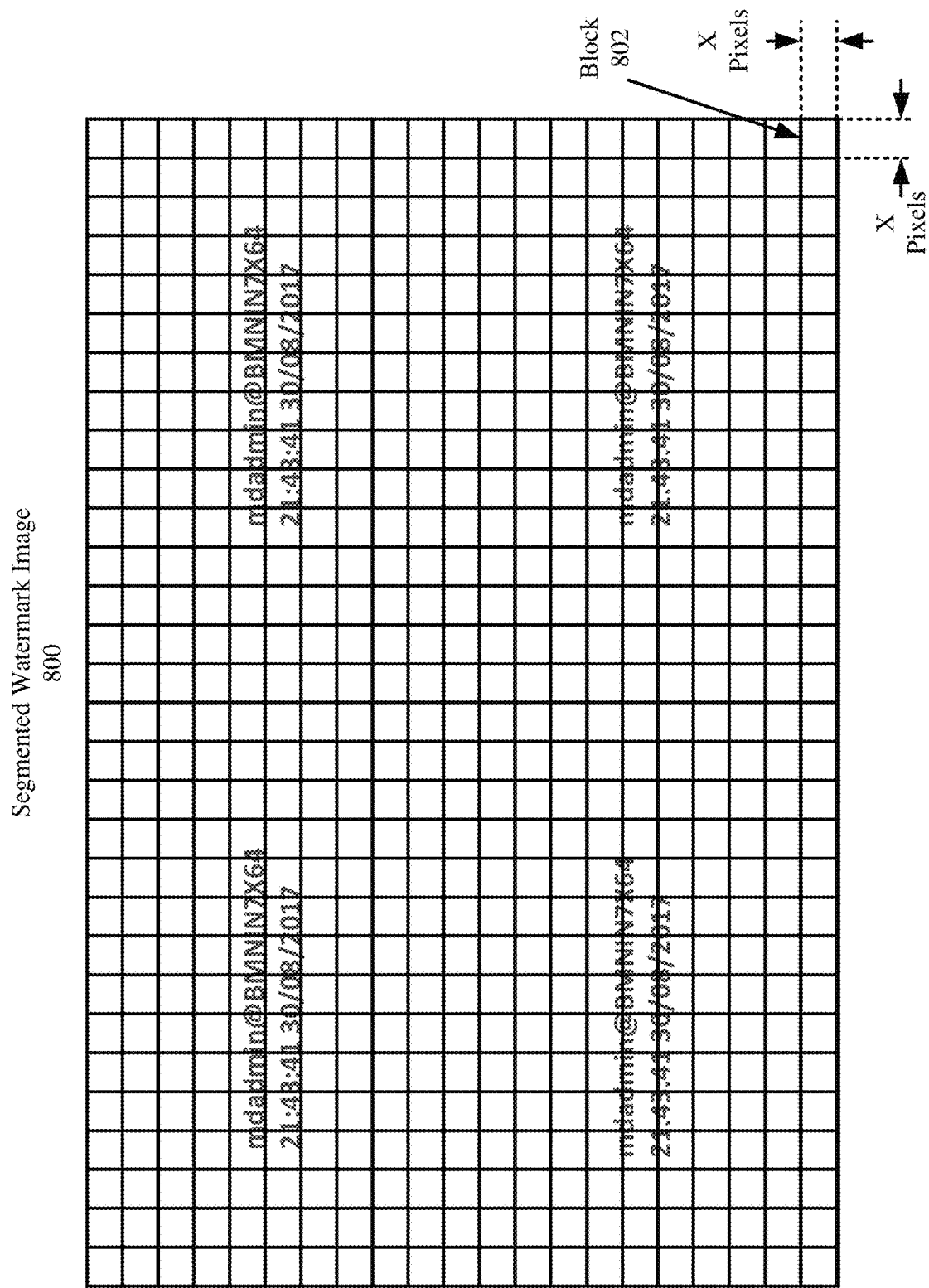
FIG. 8 is an illustration of an illustrative segmented watermark image.
Figure 9:
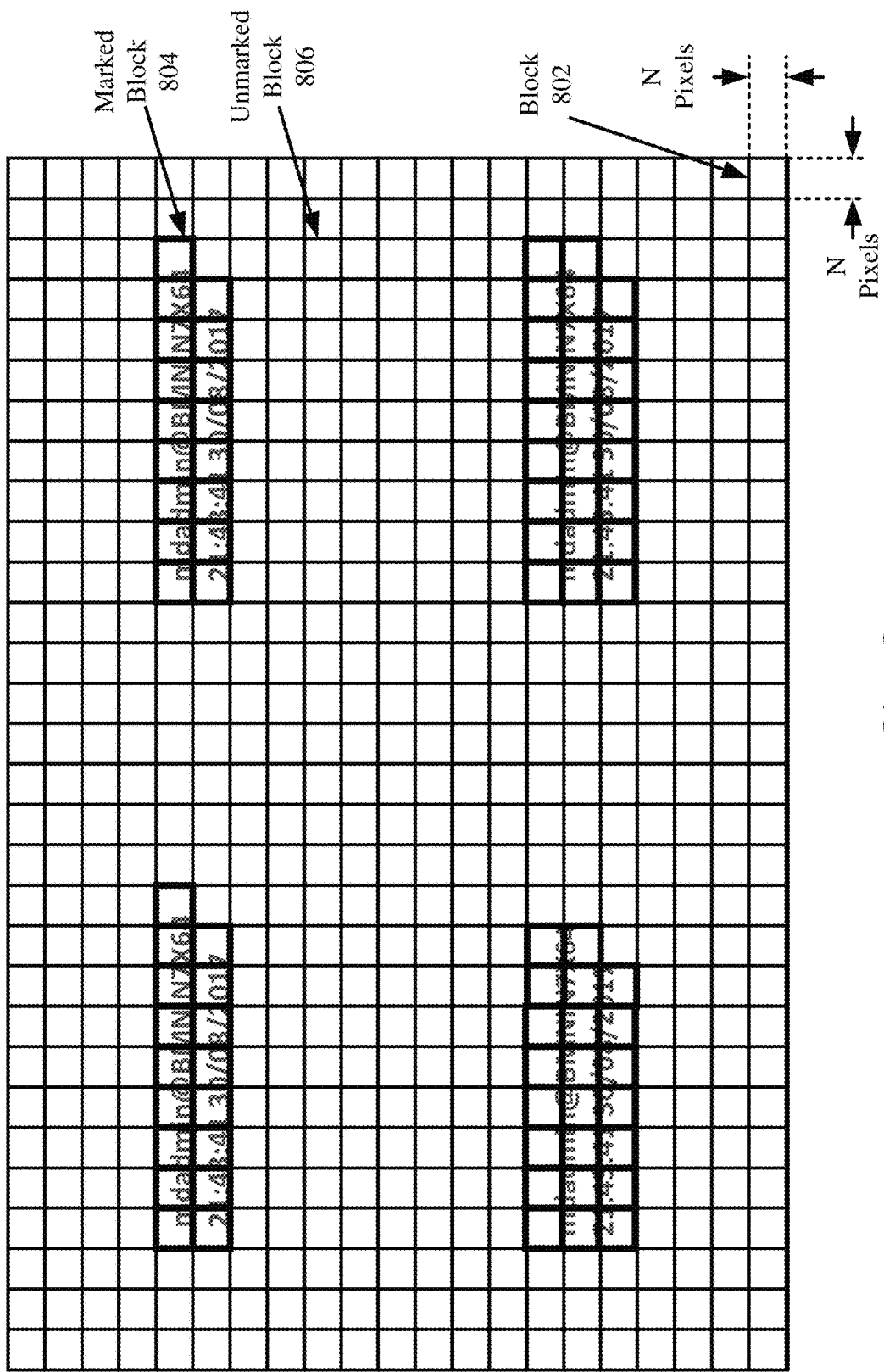
FIG. 9 is an illustration of an illustrative marked segmented watermark image.
Figure 10:
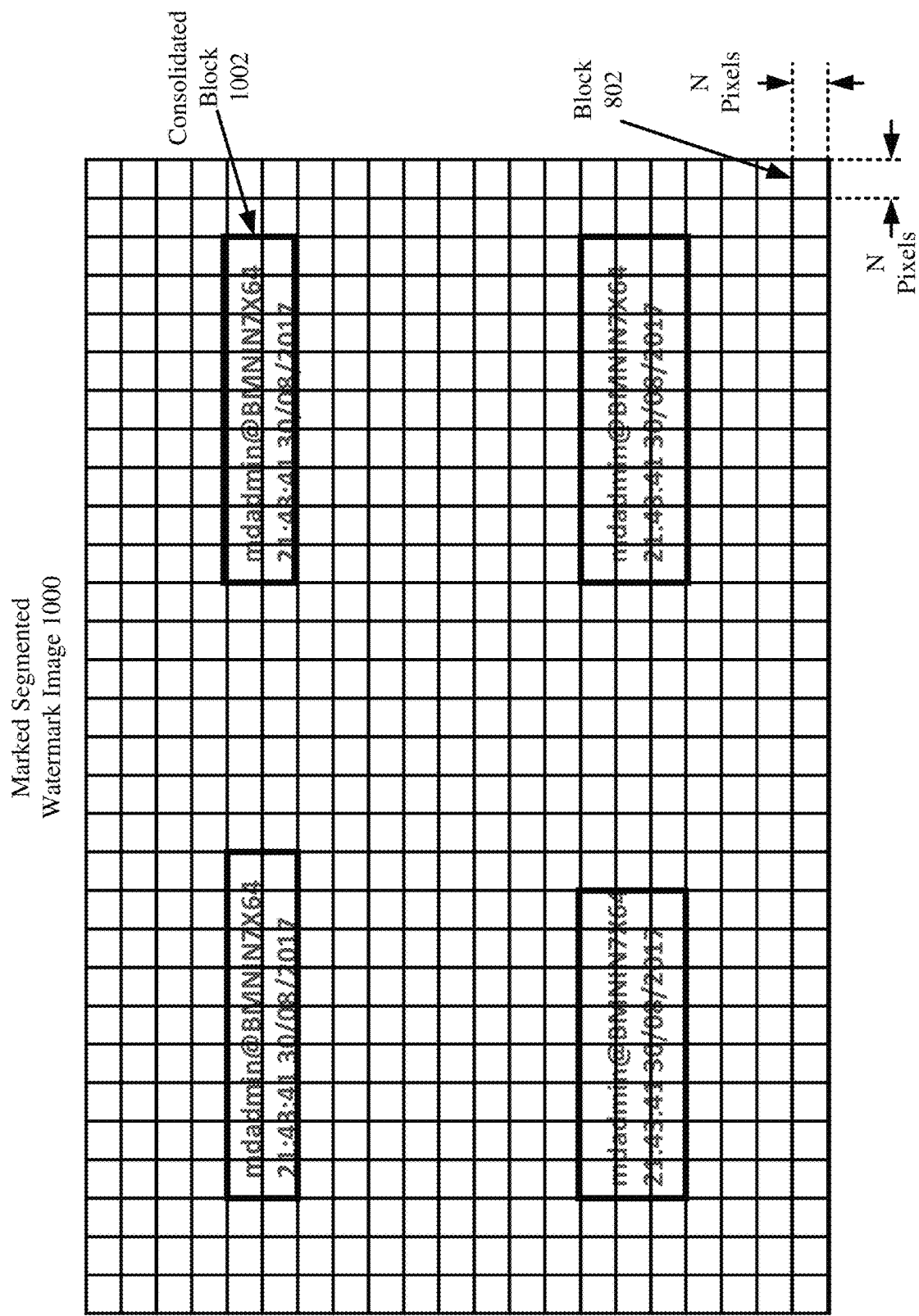
FIG. 10 is an illustration of an illustrative marked segmented watermark image with consolidated blocks.

In next 618, the full screen size watermark image(s) is(are) communicated from the watermark generator to the GE. The GE then performs operations in 620 to determine where in the full screen size watermark image(s) the watermark instances exist. In some scenarios, this determination is achieved by segmenting each full screen size watermark image into a plurality of equally sized blocks. An illustration of an illustrative segmented watermark image 800 is provided in FIG. 8. The segmented watermark image 800 comprises a plurality of blocks 802. Each block 802 has a size of X pixels by X pixels, where X is an integer (e.g., 16). The segmented watermark image 800 is then analyzed to identify which blocks 802 contain a portion of a watermark instance. The identified blocks are then marked. The marked blocks are referred to herein by reference number 804, and the unmarked blocks are referred to herein by reference number 806. Next, the GE performs operations to generate a marked segmented watermark image 1000 comprising consolidated blocks 1002. Each consolidated block 1002 has a generally rectangular shape defined by a plurality of adjacent marked blocks 804, and therefore constitute a larger block than the square shaped blocks 804. The present solution is not limited in this regard. The consolidated blocks 1002 can have shapes other than rectangular shapes.

A watermark bit map is then generated in 622. The watermark bit map can be generated using the particulars of the consolidated blocks 1002. An illustration of an illustrative watermark bit map 1100 is provided in FIG. 11. The watermark bit map 1100 can include, but is not limited to, a table containing information specifying a bit value for each pixel included in each consolidated blocks 1002. A pixel value of 0 means that the color value of the pixel is not changed as a result of an overlaid watermark. A pixel value of 1 means that the color value of the pixel is changed as a result of an overlaid watermark. The present solution is not limited to the particulars of this scenario.

Referring again to FIG. 6A, 624 involves establishing a session between the client computing device and the remote server. Techniques for establishing a session are well known in the art, and therefore will not be described herein. Any known or to be known technique for session establishment can be used herein without limitation.

During the session, the GE receives graphics from other components (e.g., a graphics card driver) of the remote server. In 628, the GE performs operations to analyze the graphics to determine if updates to at least one graphic needs to be communicated to the client computing device. If so, method 600 continues with 630 of FIG. 6B.

As shown in FIG. 6B, 630 involves generating, by the GE, a first graphics update message (e.g., graphics update message 300 of FIG. 3). The first graphics update message includes a first string of commands for updating the graphic (e.g., commands 302-306 of FIG. 3) and an EOF command (e.g., EOF command 308 of FIG. 3). The first string of commands can include, but are not limited to, a command for drawing a new image at a first location on a screen, a command for drawing new text at a second location on the screen, a command for drawing an image from a local cache at a third location on the screen, and/or a command for copying one part of the screen to another part of the screen.

Next, the GE uses the watermark bit map to make a determination in 632 as to whether there are any pixels of the graphic that would be affected by the watermark if overlaid thereon. This determination can be made by identifying a portion of the graphic which is to be displayed on a screen at a location of a consolidated block 1002. If a portion is indeed identified, then a determination is made that there are pixels in the graphic that would be affected by an overlaid watermark. If no portion is identified, then a determination is made that there are not any pixels of the graphic that would be affected by an overlaid watermark.

If one or more of the pixels in the graphic would not be affected by an overlaid watermark [634:NO], then method 600 continues with 636 where the first graphics update message is communicated from the GE of the remote server to a Web Receiver (e.g., Web Receiver 118$_1$, . . . , 118$_N$ of FIG. 1) of the client computing device. The Web Receiver then performs operations in 638 to construct an updated graphic in memory (e.g., memory 212 of FIG. 2) for a given frame in accordance with the first string of commands contained in the first graphics update message. Techniques for constructing an updated graphic in memory are well known in the art, and therefore will not be described herein. Any known or to be known technique for constructing an updated graphic in memory can be used herein without limitation. The updated graphic is then displayed on a screen by the Web Receiver in response to the EOF command contained in the first graphics update message, as shown by 640. Subsequently, 642 is performed where method 600 ends or other processing is performed.

If one or more of the pixels in the graphic would be affected by an overlaid watermark [634:YES], then method 600 continues with 644 of FIG. 6B which involves using the watermark bit map, by the GE, to identify the pixels of the graphic that would be affected by the watermark if overlaid thereon. Since the GE (a) knows the locations of consolidated blocks of a marked segmented full screen watermark image and (b) the location on a full sized screen where the graphic is to be displayed, it can identify the pixels of the graphic which have the same locations as the pixels of one or more consolidated blocks. New color values are computed for the pixels identified in 644, as shown by 646. Each color value is defined by Red, Green and Blue ("RGB") values. The computation can involve combining the RGB color value of a graphic pixel with the RGB color value of a respective watermark pixel.

Next in 648, the GE performs operations to generate a second string of commands (e.g., commands 408, . . . , 412 of FIG. 4) for modifying the identified pixels in accordance with the new color values computed in 646. The second string of commands includes, but is not limited to, information indicating which pixels of the graphic should include a watermark and the re-computed color values for these pixels.

The second string of commands is then used in 650 to generate a second graphics update message (e.g., graphics update message 400 of FIG. 4). The second graphics update message is generated by inserting the second string of commands in between the first string of commands and the EOF command of the first graphics update message. The second graphics update message is communicated from the GE to the Web Receiver in 652.

At the Web Receiver, an updated graphic is constructed in memory for a given frame in accordance with the first string of commands contained in the second graphics update message, as shown by 654. The Web Receiver then modifies the constructed updated graphic to include the watermark in accordance with the second string of commands contained in the second graphics update message, as shown by 656. In response to the EOF command contained in the second graphics update message, the constructed updated graphic with the watermark is displayed on a screen in 658. Subsequently, 660 is performed where method 600 ends or other processing is performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for providing a visible watermark in a remote session, comprising:
   generating, each time a graphics encoder of a server is initialized and prior to an establishment of the remote session, (a) at least one image that includes one or more instances of the visible watermark on a solid color background, in accordance with a known screen size of a client computing device, and (b) a watermark bit map indicating where each said instance of the visible watermark exists in the at least one image;
   performing operations, by the server, to determine if an update to a graphic needs to be reported to the client computing device during the remote session, where the graphic comprises a visual feature of a display or window, and the update to the graphic comprises a modification to or a replacement of at least a portion of the visual feature;
   generating a first graphic update message in response to a determination that an update to the graphic needs to be reported to the client computing device, the first graphic update message comprising a first string of commands for updating the graphic and an End-Of-Frame ("EOF") command;
   using the watermark bit map to identify pixels of the graphic which would be affected by said one or more instances of the visible watermark if both the graphic and the one or more instances of the visible watermark were displayed on the screen of the client computing device;
   constructing a second string of commands specifying a new color value for each of the pixels that were previously identified;
   converting the first graphic update message to a second graphic update message by inserting the second string of commands in between the first string of commands and the EOF command; and
   communicating the second graphic update message from the sever to the client computing device.

2. The method according to claim 1, wherein the method is at least partially performed by the graphics encoder of the server.

3. The method according to claim 1, further comprising using a device identifier for the client computing device to obtain respective pre-defined watermark parameter information from a datastore.

4. The method according to claim 3, wherein the at least one image comprises at least one full screen size image generated based on the obtained respective pre-defined watermark parameter information and the known screen size of the client computing device.

5. The method according to claim 4, wherein the at least one full screen size watermark image comprises at least one instance of a watermark on a white or black background.

6. The method according to claim 4, wherein the watermark bit map is generated by identifying an area of the at least one full screen size image where one said instance of the visible watermark exists.

7. The method according to claim 6, where the area is identified by:
   segmenting the at least one full screen size image into a plurality of equally sized blocks; and
   identifying which blocks of the plurality of equally sized blocks contain a portion of the visible watermark.

8. The method according to claim 7, wherein the area is identified further by consolidating adjacent ones of the identified blocks to create a larger block.

9. The method according to claim 6, wherein the watermark bit map (a) indicates the identified area of the at least one full screen size image where each instance of the visible watermark exists and (b) indicates which pixels of the identified area comprise the visible watermark.

10. The method according to claim 1, further comprising initializing the graphics encoder of the server in response to the server's reception of at least a device identifier from the client computing device.

11. A system, comprising:
    at least one processing element; and
    a non-transitory computer-readable storage medium comprising programming instructions that are configured to cause the at least one processing element to implement a method for providing a visible watermark in a remote session, wherein the programming instructions comprise instructions to:
    generate, each time a graphics encoder of the processing element is initialized and prior to an establishment of the remote session, (a) at least one image that includes one or more instances of the visible watermark on a solid color background, in accordance with a known screen size of a client computing device, and (b) a watermark bit map indicating where each said instance of the visible watermark exists in the at least one image;
    determine if an update to a graphic needs to be reported to the client computing device during the remote session, where the graphic comprises a visual feature of a display or window, and the update to the graphic comprises a modification to or a replacement of at least a portion of the visual feature;
    generate a first graphic update message in response to a determination that an update to the graphic needs to be reported to the client computing device, the first graphic update message comprising a first string of commands for updating the graphic and an End-Of-Frame ("EOF") command;
    using the watermark bit map to identify pixels of the graphic which would be affected by said one or more instances of the visible watermark if both the graphic and the one or more instances of the visible watermark were displayed on the screen of the client computing device;
    construct a second string of commands specifying a new color value for each of the pixels that were previously identified;
    convert the first graphic update message to a second graphic update message by inserting the second string of commands in between the first string of commands and the EOF command; and
    cause the second graphic update message to be communicated to the client computing device.

12. The system according to claim 11, wherein the programming instructions further comprise instructions to use a device identifier for the client computing device to obtain respective pre-defined watermark parameter information from a datastore.

13. The system according to claim 12, wherein the at least one image comprises at least one full screen size image generated based on the obtained respective pre-defined watermark parameter information and the known screen size of the client computing device.

14. The system according to claim 13, wherein the at least one full screen size watermark image comprises at least one instance of a watermark on a white or black background.

15. The system according to claim 13, wherein the watermark bit map is generated by identifying an area of the at least one full screen size image where one said instances of the visible watermark exists.

16. The system according to claim 15, wherein the area is identified by:
- segmenting the at least one full screen size image into a plurality of equally sized blocks; and
- identifying which blocks of the plurality of equally sized blocks contain a portion of the visible watermark.

17. The system according to claim 16, wherein the area is identified further by consolidating adjacent ones of the identified blocks to create a larger block.

18. The system according to claim 15, wherein the watermark bit map (a) indicates the identified area of the at least one full screen size image where each instance of the visible watermark exists and (b) indicates which pixels of the identified area comprise the visible watermark.

* * * * *